United States Patent
Hu et al.

(10) Patent No.: US 10,924,783 B2
(45) Date of Patent: *Feb. 16, 2021

(54) VIDEO CODING METHOD, SYSTEM AND SERVER

(71) Applicant: Tencent Technology (Shenzhen) Company Limited, Shenzhen (CN)

(72) Inventors: Xinghua Hu, Shenzhen (CN); Xinhai Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/703,701

(22) Filed: Dec. 4, 2019

(65) Prior Publication Data

US 2020/0107057 A1 Apr. 2, 2020

Related U.S. Application Data

(63) Continuation of application No. 15/638,710, filed on Jun. 30, 2017, now Pat. No. 10,536,732, which is a
(Continued)

(30) Foreign Application Priority Data

Jan. 14, 2015 (CN) .......................... 2015 1 0018745

(51) Int. Cl.
*H04N 21/2343* (2011.01)
*H04N 19/436* (2014.01)
*H04L 29/06* (2006.01)

(52) U.S. Cl.
CPC ..... *H04N 21/234345* (2013.01); *H04L 65/60* (2013.01); *H04N 19/436* (2014.11); *H04N 21/2343* (2013.01)

(58) Field of Classification Search
CPC ......... H04N 21/234345; H04N 19/436; H04N 21/2343; H04N 7/50; H04N 7/26244;
(Continued)

(56) References Cited

U.S. PATENT DOCUMENTS 5,138,447 A 8/1992 Shen et al.
6,338,467 B1 1/2002 Mabboux et al.
(Continued)

FOREIGN PATENT DOCUMENTS

CN 1211136 A 3/1999
CN 101098483 A 1/2008
(Continued)

OTHER PUBLICATIONS

Tencent Technology, ISRWO, PCT/CN2015/096578, dated Mar. 7, 2016, 10 pgs.
(Continued)

*Primary Examiner* — Anthony Bantamoi
(74) *Attorney, Agent, or Firm* — Morgan, Lewis & Bockius LLP

(57) ABSTRACT

Disclosed is a video coding method performed at a video coding system, in which original collected video data is received from a coding requesting terminal; each video frame image of the original collected video data is divided into multiple subarea images; the subarea images divided from each video frame image are transmitted to coding servers of which a coder is performed from a multithreaded framework into a multi-process framework, to code a respective subset of the subarea images in a second coding scheme and output a coded video stream corresponding to the respective subset of the subarea images; and the coded video streams are then merged into a target video stream in the second coding scheme and sent to a user terminal. The user terminal decodes the target video stream from the
(Continued)

second coding scheme into a second sequence of video frame images to be played at the user terminal.

20 Claims, 9 Drawing Sheets

Related U.S. Application Data continuation of application No. PCT/CN2015/096578, filed on Dec. 7, 2015.

(58) Field of Classification Search
CPC .......... H04N 7/26313; H04N 7/26271; H04N 7/26015; H04L 65/60
See application file for complete search history.

(56) References Cited

U.S. PATENT DOCUMENTS

| 9,510,033 | B1 | 11/2016 | Corley et al. |
| 2008/0137736 | A1 | 6/2008 | Richardson et al. |
| 2009/0037967 | A1 | 2/2009 | Barkan et al. |
| 2010/0225655 | A1 | 9/2010 | Tung et al. |
| 2012/0114034 | A1 | 5/2012 | Huang et al. |
| 2014/0213353 | A1 | 7/2014 | Lee et al. |
| 2014/0229579 | A1 | 8/2014 | Johnson |
| 2015/0092076 | A1 | 4/2015 | Campbell et al. |
| 2016/0057465 | A1 | 2/2016 | Jones et al. |

FOREIGN PATENT DOCUMENTS

| CN | 101562706 A | 10/2009 |
| CN | 101587431 A | 11/2009 |
| CN | 102045312 A | 5/2011 |
| CN | 102724560 A | 10/2012 |
| CN | 102811373 A | 12/2012 |
| CN | 102938839 A | 2/2013 |
| CN | 104602008 A | 5/2015 |
| EP | 0499088 A2 | 8/1992 |
| JP | 2013145954 A | 7/2013 |

OTHER PUBLICATIONS

Tencent Technology, IPRP, PCT/CN2015/096578, dated Jul. 18, 2017, 8 pgs.
Supplemental European Search Report, 15877667.4, dated Aug. 20, 2018, 8 pgs.

VIDEO CODING METHOD, SYSTEM AND SERVER

CROSS-REFERENCE TO RELATED APPLICATIONS

This is a continuation application of U.S. patent application Ser. No. 15/638,710, filed on Jun. 30, 2017, which is a continuation of International Patent Application No. PCT/CN2015/096578, filed on Dec. 7, 2015, which claims priority to Chinese Patent Application No. 201510018745.5 filed on Jan. 14, 2015. The disclosures of these applications are hereby incorporated by reference in their entirety.

BACKGROUND

Video coding is converting a file in a certain video format into a file in another video format by means of a particular compression technology. At present, after acquiring original collected video data, a client can perform compression coding to the original collected video data in real time and uploads it to a video server, and then the video server issues a video stream to a user by means of a Content Delivery Network (CDN).

However, the current video coding method has a very high requirement on hardware configuration of a device where the client performing video coding is, and has low coding efficiency; especially for some emerging video coding technologies, like H.265, video coding can only be performed on the client narrowly on the premise of reducing the video quality and resolution, so these video coding technologies are difficult to be applied to the civil field. H.265 is a new video coding standard set by the International Telecommunication Union Telecommunication Standardization Sector (ITU-T) Video Coding Experts Group (VCEG) after H.264.

SUMMARY

The disclosure generally relates to the field of video processing technology, and more particularly, to a video coding method, system and server.

According to a first aspect, a video coding method is provided, which includes: receiving original collected video data from a coding requesting terminal, or receiving a transmission video stream from the coding requesting terminal, wherein the coding requesting terminal obtains the transmission video stream by performing compression coding on the original collected video data in a first coding scheme; dividing each video frame image of the original collected video data into multiple subarea images, or dividing each video frame image of the original collected video data obtained by decoding the transmission video stream into multiple subarea images; transmitting the subarea images divided from each video frame image to multiple coding servers, to code the subarea images in a second coding scheme and output a coded video stream; and merging the coded video streams output by the coding servers into a target video stream.

According to a second aspect, a server is provided, which includes a nonvolatile storage medium and a processor; the nonvolatile storage medium having instructions stored therein, the instructions, when executed by the processor, causing the processor to perform the following steps: receiving original collected video data from a coding requesting terminal, or receiving a transmission video stream from the coding requesting terminal, wherein the coding requesting terminal obtains the transmission video stream by performing compression coding on the original collected video data in a first coding scheme; dividing each video frame image of the original collected video data into multiple subarea images, or dividing each video frame image of the original collected video data obtained by decoding the transmission video stream into multiple subarea images; transmitting the subarea images divided from each video frame image to multiple coding servers, to code the subarea images in a second coding scheme and output a coded video stream; and merging the coded video streams output by the coding servers into a target video stream.

According to a third aspect, a video coding system is provided, which includes a distributing server, a managing server, multiple coding servers, and a stream merging server; the distributing server is connected with the coding servers, the coding servers are connected with the stream merging server, and the managing server is connected with the distributing server, the coding servers and the stream merging server, respectively; the distributing server is configured to receive original collected video data from a coding requesting terminal, or receive a transmission video stream from the coding requesting terminal, wherein the coding requesting terminal obtains the transmission video stream by performing compression coding on the original collected video data in a first coding scheme; the managing server is configured to divide each video frame image of the original collected video data into multiple subarea images, or divide each video frame image of the original collected video data obtained by decoding the transmission video stream into multiple subarea images; the distributing server is further configured to transmit the subarea images divided from each video frame image to multiple coding servers; the coding servers are configured to receive the subarea images from the distributing server, and code the subarea images in a second coding scheme and output a coded video stream; and the stream merging server is configured to merge the coded video streams output by the coding servers into a target video stream.

BRIEF DESCRIPTION OF THE DRAWINGS

In order to more clearly illustrate the technical solutions in embodiments of the disclosure or the traditional art, the accompanying drawings needed in description of the embodiments or the traditional art are simply introduced below. Obviously, the accompanying drawings in the following description are only some embodiments of the disclosure, for the ordinary skill in the art, some other accompanying drawings can also be obtained according to these on the premise of not contributing creative effort.

DETAILED DESCRIPTION

The technical solutions and the advantages of the disclosure will become clearer in view of the detailed description below in combination with the accompanying drawings and embodiments. It should be understood that the specific embodiments described here are only used for illustrating the disclosure and not intended to limit the disclosure.

At present, H.265 is a new video coding format. Coding a video into the H.265 format consumes much more resources than coding a video into an H.264 format, so it is difficult to apply the H.265 format to the civilian field. An X265 coder, which is multithreaded, may be used to code a video into the H.265 format. The disclosure reforms the architecture of the X265 coder, particularly reforms the multithreaded framework into a multi-process framework, so that the X265 coder can be deployed on different coding servers to perform H.265-format coding simultaneously.

Figure 1:
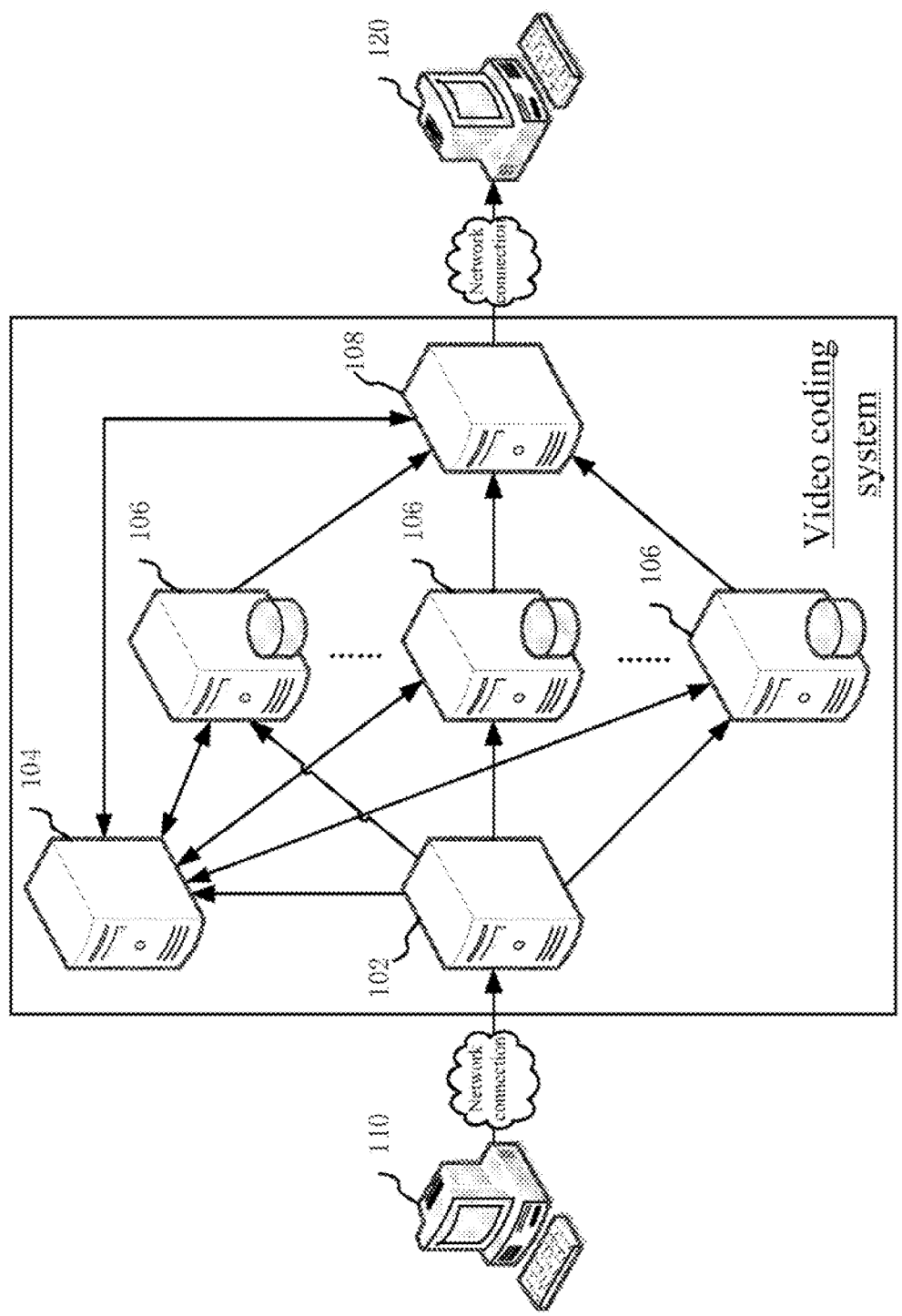
FIG. 1 is a context diagram of a video coding system, according to an exemplary embodiment.

As shown in FIG. 1, in an embodiment, a video coding system 100 is provided, which includes a distributing server 102, a managing server 104, a coding server 106, and a stream merging server 108. The distributing server 102 is connected with a coding requesting terminal 110 over a network, and the stream merging server 108 is connected, over the network, with a user terminal 120 specified by the coding requesting terminal 110. The video coding system 100 is configured to implement a video coding method. The distributing server 102, the managing server 104, and the stream merging server 108 can either be a same server or individual servers. There are at least two coding servers 106, and one of which can either be a physically individual server or a virtual logical server formed by multiple physical servers.

Figure 2:
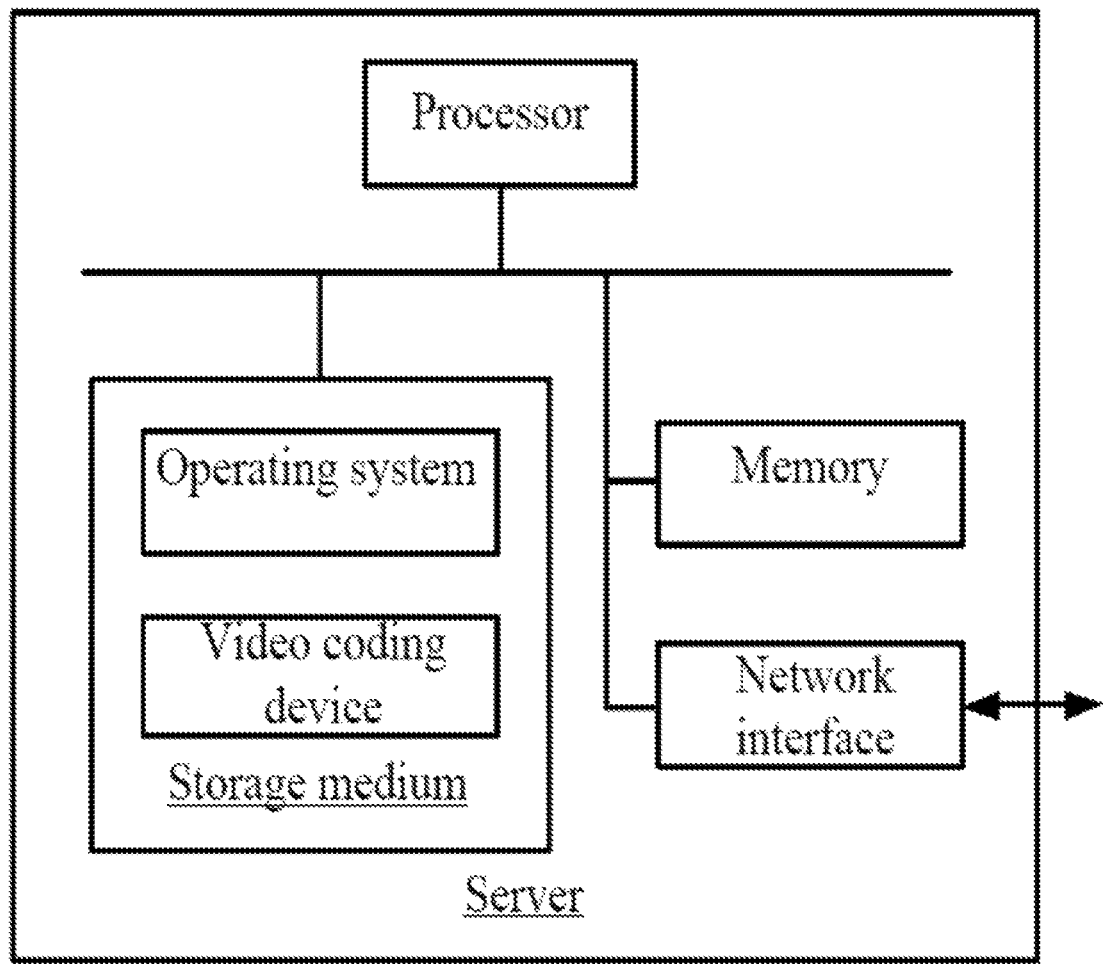
FIG. 2 is a block diagram of a server for implementing functions of a distributing server, a managing server, and a stream merging server, according to an exemplary embodiment.

As shown in FIG. 2, in an embodiment, a server is provided for implementing functions of the distributing server 102, the managing server 104, and the stream merging server 108 in FIG. 1. The server includes a processor, a memory, a storage medium, and a network interface which are connected by a system bus. The storage medium of the server stores an operating system and a video coding device configured to implement a video coding method. The processor of the server is configured to perform a video coding method. The memory of the server provides a running environment for the video coding device in the storage medium. The server can be either an individual server or a server cluster composed of multiple servers that can intercommunicate with each other. Each of the functional modules of the video coding device can be distributed on a respective server of the server cluster.

Figure 3:
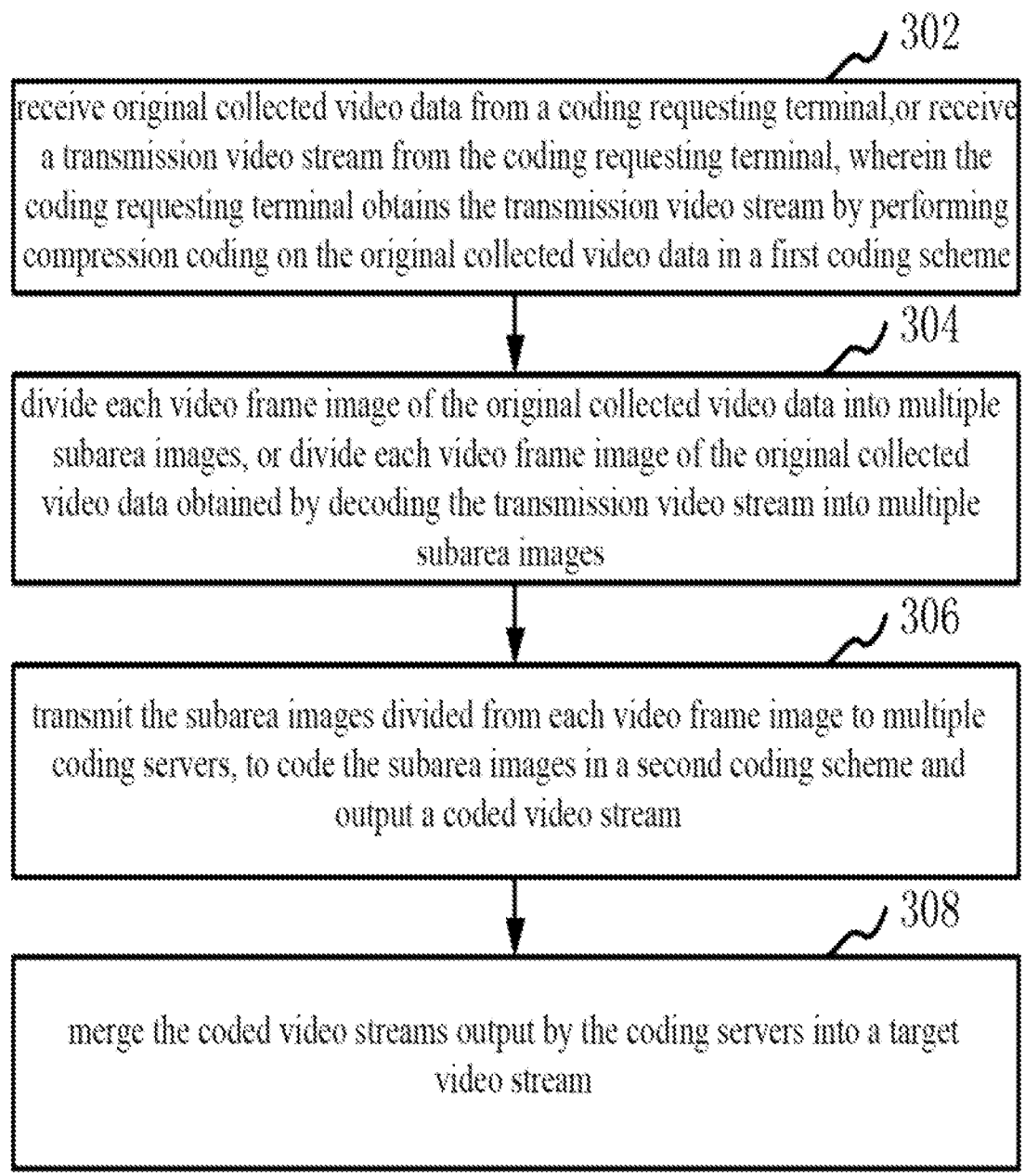
FIG. 3 is a flow chart showing a video coding method, according to an exemplary embodiment.

As shown in FIG. 3, in an embodiment, a video coding method is provided. The embodiment is illustrated on the premise of applying the method to the video coding system 100 shown in FIG. 1. The method specifically includes the following steps.

Step 302: original collected video data is received from the coding requesting terminal, or a transmission video stream is received from the coding requesting terminal, wherein the transmission video stream is obtained by the coding requesting terminal performing compression coding on the original collected video data in a first coding scheme.

The coding requesting terminal is a terminal that has a coding requirement and requests to code a video. The coding requesting terminal can be a client, for example, a video call client or a video interaction client; the coding requesting terminal can also be a service operation terminal, for example, a live match operation terminal or a live television operation terminal.

The coding requesting terminal includes or is connected to a video capture device; the video capture device can be a video camera, a camera, or a graphics card supporting the Direct 3D (D3D, which is a three-dimensional graphics application programming interface based on the Microsoft's Common Object Mode (COM)). The original collected video data refers to original video data captured by the coding requesting terminal and not subjected to compression coding. The original collected video data can be either the video data captured by the video camera or the camera, or D3D game video data output by the graphics card supporting the D3D.

The original collected video data can be directly sent by the coding requesting terminal to the distributing server, and received by the distributing server. Or, the coding requesting terminal may perform compression coding on the original collected video data in the first coding scheme, so as to obtain a transmission video stream suitable for transmission; and then, the transmission video stream is transmitted to the distributing server and received by the distributing server.

Here, the resources required by the first coding scheme are less than the resources required by the following second coding scheme. In an embodiment, the first coding scheme is the H.264-format coding scheme, and the second coding scheme is the H.265-format coding scheme. Here, coding the original collected video data into the H.265 format requires much more resources than coding the original collected video data into the H.264 format.

It depends on actual needs to determine whether to perform compression coding on the original collected video data in the first coding scheme before transmission. If the coding requesting terminal is the client, it is difficult to realize real-time transmission of the original collected video data by means of the current communication network, and thus compression coding may be performed on the original collected video data in the first coding scheme before it is transmitted to the distributing server. If the coding requesting terminal is the service operation terminal, the original collected video data can be sent to the distributing server directly when the network status is good or the requirement for real-time performance is not high.

Step 304: each video frame image of the original collected video data is divided into multiple subarea images, or each video frame image of the original collected video data obtained by decoding the transmission video stream is divided into multiple subarea images.

The original collected video data includes a number of video frame images. If it is the original collected video data that is received by the distributing server, then the distributing server sends a coding request to the managing server, and the managing server divides, according to the coding request, each video frame image of the original collected video data into multiple subarea images. Or, if it is the transmission video stream that is received by the distributing server, then the distributing server decodes the transmission video stream into the original collected video data, and sends the coding request to the managing server; the managing server divides, according to the coding request, each video frame image of the decoded original collected video data into multiple subarea images.

Figure 4:
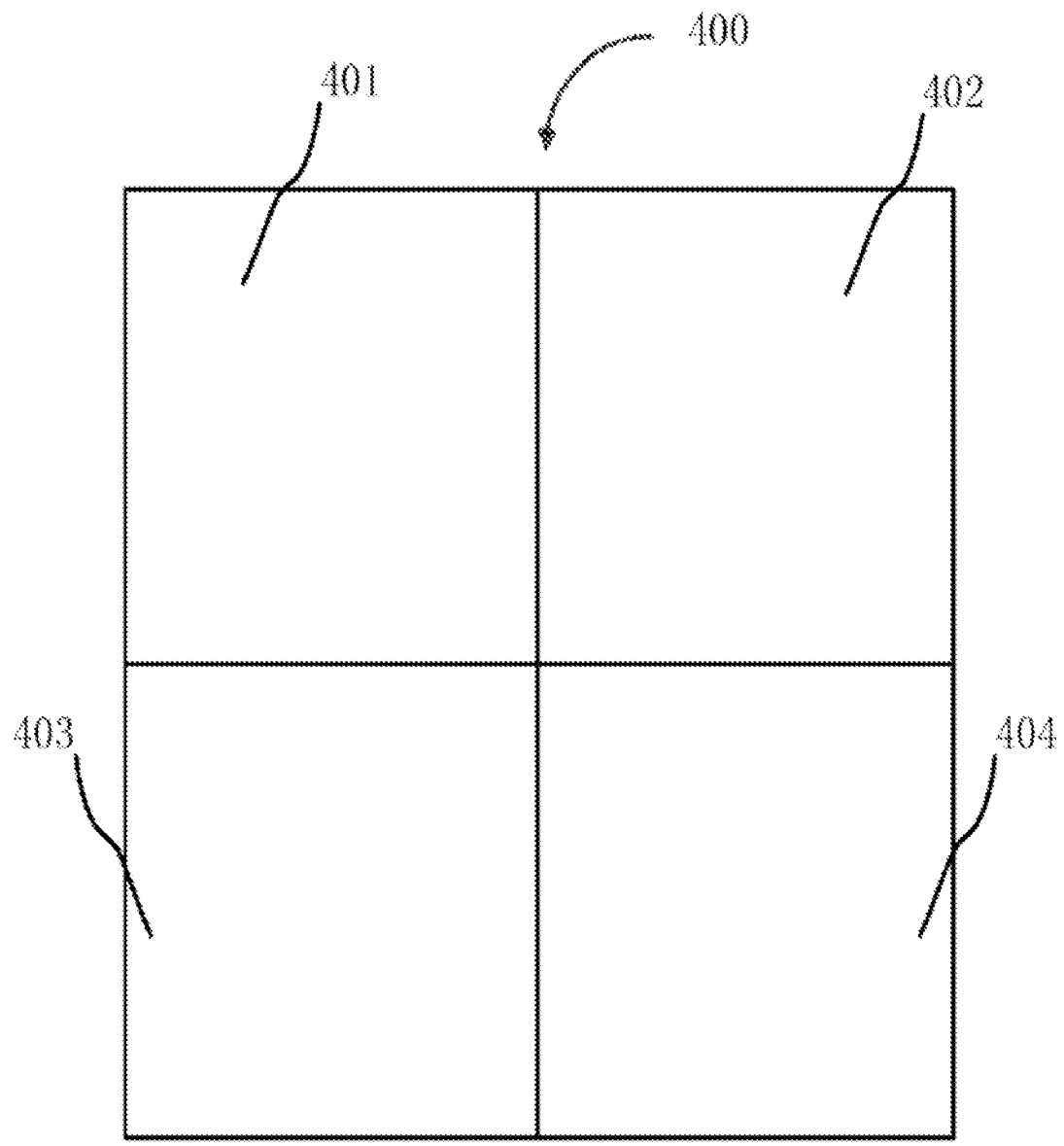
FIG. 4 is a schematic diagram of quartering a video frame image in original collected video data, according to an exemplary embodiment.

The subarea images are the images in areas obtained by dividing a video frame image into multiple areas. Preferably, the managing server can uniformly divide each video frame image of the original collected video data into multiple subarea images, so that the subarea images have a same size. For example, the managing server can divide each video frame image of the original collected video data into two equal parts, three equal parts, four equal parts, eight equal parts, and so on. For example, referring to FIG. 4, one video frame image 400 in the original collected video data can be equally divided into four subarea images 401, 402, 403, and 404.

Step 306: the subarea images obtained by dividing each video frame image are transmitted to multiple coding servers which code the subarea images in a second coding scheme and output the coded video streams.

The number of the subarea images obtained by dividing each video frame image of the original collected video data can be equal to the number of the coding servers, then each video frame image can be assigned to one of the coding servers; the corresponding coding server performs coding on the subarea images in the second coding scheme, outputs coded images in sequence to form the coded video stream, and outputs the coded video stream to the stream merging server. Of course, the number of the subarea images obtained by dividing each video frame image of the original collected video data can also not be equal to the number of the coding servers. In this case, according to the load condition of each coding server, the current least loaded coding server may be scheduled for the divided subarea images.

The managing server can generate a coding subtask according to the coding request sent by the distributing server and assign the coding subtask to each coding server; each coding server receives the subarea images from the distributing server, codes the received subarea images in the second coding scheme into coded images according to the coding subtask assigned by the managing server, and outputs the coded images in sequence to form the coded video stream.

In an embodiment, a subarea image obtained by dividing each video frame image carries location information for determining the location of the subarea image in the video frame image of the original collected video data. For example, a subarea image can carry an array [1, 2], which indicates that the subarea image is the second subarea image in the first video frame image of the original collected video data.

In an embodiment, a subarea image obtained by dividing each video frame image can carry an image identifier, and the managing server can record the location information corresponding to the image identifier. Here, the location information is used for determining the location of the subarea image in the video frame image of the original collected video data. For example, a subarea image can carry the image identifier 1.2, and the managing server can record that the image identifier 1.2 corresponds to the second subarea image in the first video frame image of the original collected video data.

Step 308: the coded video streams output by each coding server are merged into a target video stream.

The stream merging server can obtain a stream merging policy from the managing server, and merges, according to the stream merging policy, the coded video streams output by the coding servers into the target video stream. Here, stream merging is a process of merging multiple coded video streams into the target video stream. The target video stream is the final video stream obtained by coding the original collected video data in the second coding scheme. The stream merging policy includes a solution about how to merge the coded video streams into the target video stream. The stream merging policy may include the location information corresponding to the coded image obtained by coding the subarea image.

In an embodiment, after Step 308, the method also includes that: the target video stream is returned to the coding requesting terminal; or, the target video stream is sent to the user terminal specified by the coding requesting terminal. Particularly, the coding requesting terminal, when sending the original collected video data or transmitting the video stream to the distributing server, may determine according to actual needs whether the stream merging server returns the target video stream back to the coding requesting terminal or the user terminal specified by the coding requesting terminal. The coding requesting terminal can carry an address of a target terminal when sending the original collected video data or transmitting the video stream, so that the stream merging server sends the target video stream to the target terminal after obtaining the target video stream. If the address of the target terminal is the address of the coding requesting terminal, then the stream merging server returns the target video stream back to the coding requesting terminal.

According to the above video coding method, each video frame image of the original collected video data is divided into multiple subarea images and the multiple subarea images are sent to multiple coding servers to perform distributed coding, and finally the coded video streams output by each coding server are merged into the target video stream. In this way, it is possible for multiple coding servers to cooperatively perform the coding, instead of performing the coding by a single device, which greatly improves the coding efficiency. Besides, the coding requesting terminal does not have to perform final complex coding in the second coding scheme, in other words, the method has a low requirement on hardware of the coding requesting terminal and enables the new coding technology to be applied to the civil field quickly.

Figure 5:
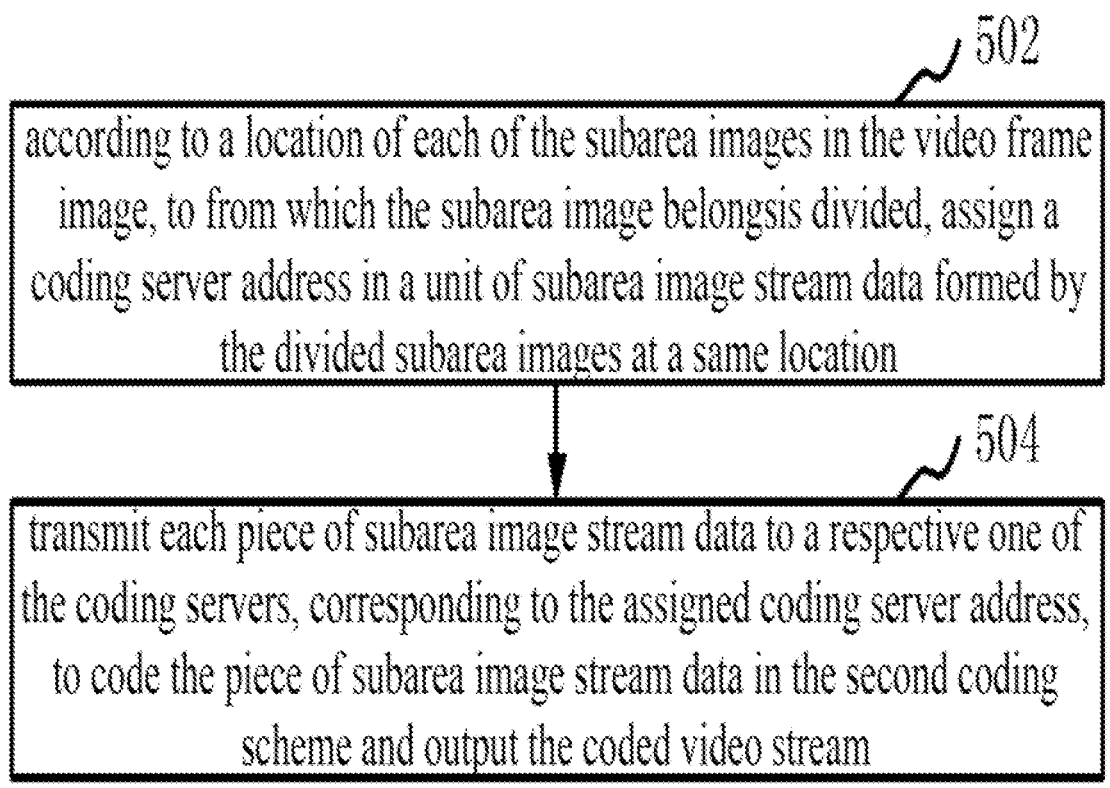
FIG. 5 is a flow chart showing the step of transmitting subarea images obtained by dividing each video frame image to multiple coding servers to perform coding in a second coding scheme and output a coded video stream, according to an exemplary embodiment.

As shown in FIG. 5, in an embodiment, Step 306 specifically includes the following steps.

Step 502: according to the location of the subarea image in the video frame image, a coding server address is assigned in a unit of subarea image stream data formed by the subarea images obtained by divisions at the same location.

Particularly, in the present embodiment, the subarea images are obtained by dividing each video frame image in the same dividing way. The video frame image to which the subarea image belongs means that the subarea image is divided from the video frame image. The subarea images divided at the same location mean that all of these subarea images are divided at the same location of the video frame images; for example, if each of the video frame images are divided into four equal parts, the subarea images at the top left corner of the video frame images can form a piece of subarea image stream data. In a unit of the subarea image stream data means assigning each piece of subarea image stream data with a different coding server address.

Figure 6:
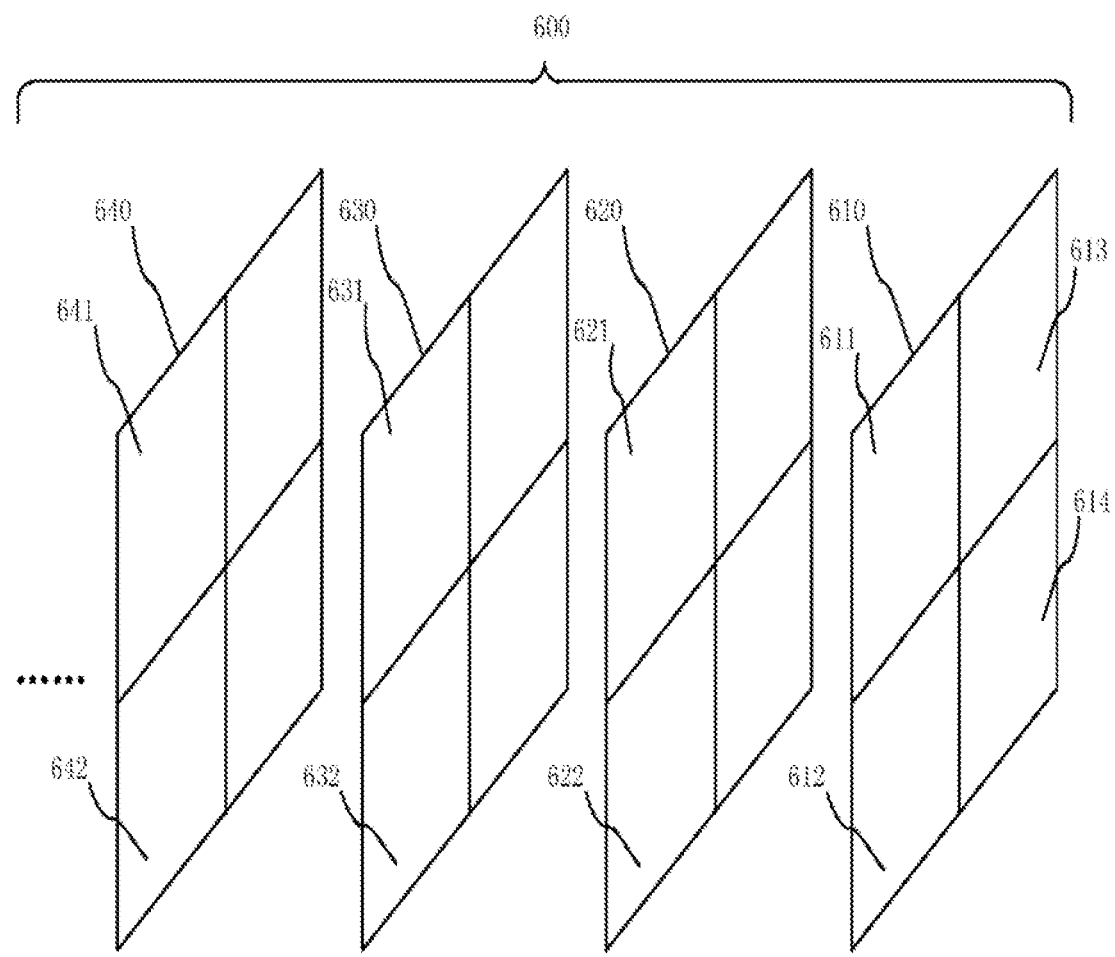
FIG. 6 is a schematic diagram illustrating each video frame image of the original collected video data, according to an exemplary embodiment.

For example, referring to FIG. 6, the original collected video data 600 includes a number of video frame images 610, 620, 630, 640 . . . , which are arranged in sequence. Each video frame image is divided into four equal parts, and each video frame image is divided into four subarea images at four locations of the video frame image. The subarea images at the top left corner of the video frame images of the original collected video data 600 are 611, 621, 631, 641 . . . respectively, which form a piece of subarea image stream data, and the managing server assigns a coding server address to the subarea image stream data. Different coding server addresses are assigned to different subarea image stream data; for example, the managing server assigns another coding server address to the subarea image stream data formed by the subarea images 612, 622, 632, 642 . . . .

Step 504: each piece of subarea image stream data is separately transmitted to the coding server corresponding to the assigned coding server address, which codes the subarea image stream data in the second coding scheme and output the coded video stream.

Particularly, referring to FIG. 6, the distributing server transmits a piece of subarea image stream data 611, 621, 631, 641 . . . to the coding server which corresponds to the coding server address assigned to said piece of subarea image stream data, and transmits another piece of subarea image stream data 612, 622, 632, 642 . . . to the coding server which corresponds to another coding server address assigned to said another piece of subarea image stream data. By analogy, all pieces of subarea image stream data are separately transmitted to different coding servers.

The managing server can generate a coding subtask according to the coding request sent by the distributing server and assign the coding subtask to each coding server; each coding server receives the subarea images from the distributing server, codes the received subarea images in the second coding scheme according to the coding subtask assigned by the managing server to obtain the coded images, and outputs the coded images in sequence to form the coded video stream.

In an embodiment, a subarea image obtained by dividing a video frame image carries the location information for determining the location of the subarea image in the video frame image of the original collected video data. In an embodiment, a subarea image obtained by dividing a video frame image can carry the image identifier, and the managing server can record the location information corresponding to the image identifier, wherein the location information is used for determining the location of the subarea image in the video frame image of the original collected video data.

In the present embodiment, the subarea images obtained by divisions at the same location are assigned to the same coding server address, and the subarea images by divisions at different locations are assigned to the different coding server addresses, and thus the stream merging server can merge the coded video streams output by each coding server efficiently, and the coding efficiency is further improved.

Figure 7:
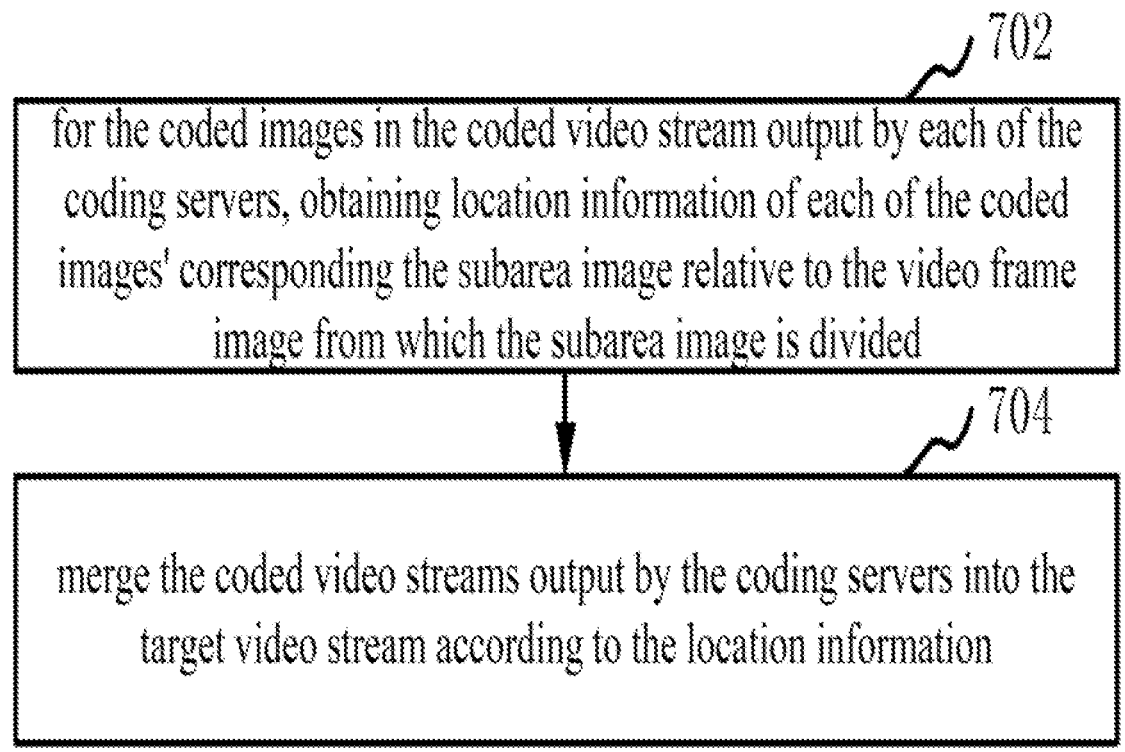
FIG. 7 is a flow chart showing the step of merging the coded video streams output by each coding server to obtain a target video stream, according to an exemplary embodiment.

As shown in FIG. 7, in an embodiment, Step 308 specifically includes the following steps.

Step 702: for each of the coded images in the coded video stream output by each of the coding servers, location information of a corresponding the subarea image, relative to the video frame image to which the subarea image belongs, is obtained.

Particularly, the coded images in the coded video streams output by each of the coding servers correspond to the subarea images in the subarea image stream data input in the coding server, and the location information of each coded image is the location information of the corresponding subarea image.

The stream merging server can obtain the location information carried by the subarea images obtained by dividing the video frame images, or obtain the location information corresponding to the image identifiers which are carried by the subarea images obtained by dividing the video frame images.

Step 704: according to the location information, the coded video streams output by the coding servers are merged into the target video stream.

Particularly, according to how each video frame image of the original collected video data is divided into multiple subarea images, the stream merging server merges the coded video streams output by the coding servers into the target video stream.

Referring to FIG. 6, after the subarea images 611, 612, 613, and 614 are coded into the coded images, the coded images are merged according to a location relationship of the subarea images in FIG. 6; by this analogy, other coded images are also merged into the target video stream according to the location relationship of the corresponding subarea images in the corresponding video frame images.

In the present embodiment, the coded video streams output by the coding servers are merged into the target video stream according to the location information of the subarea images relative to the video frame images to which the subarea images belong, the subarea images correspond to the coded images in the coded video streams output by the coding servers, and thus the coded video streams output by the coding servers can be merged efficiently, and the coding efficiency is further improved.

Figure 8:
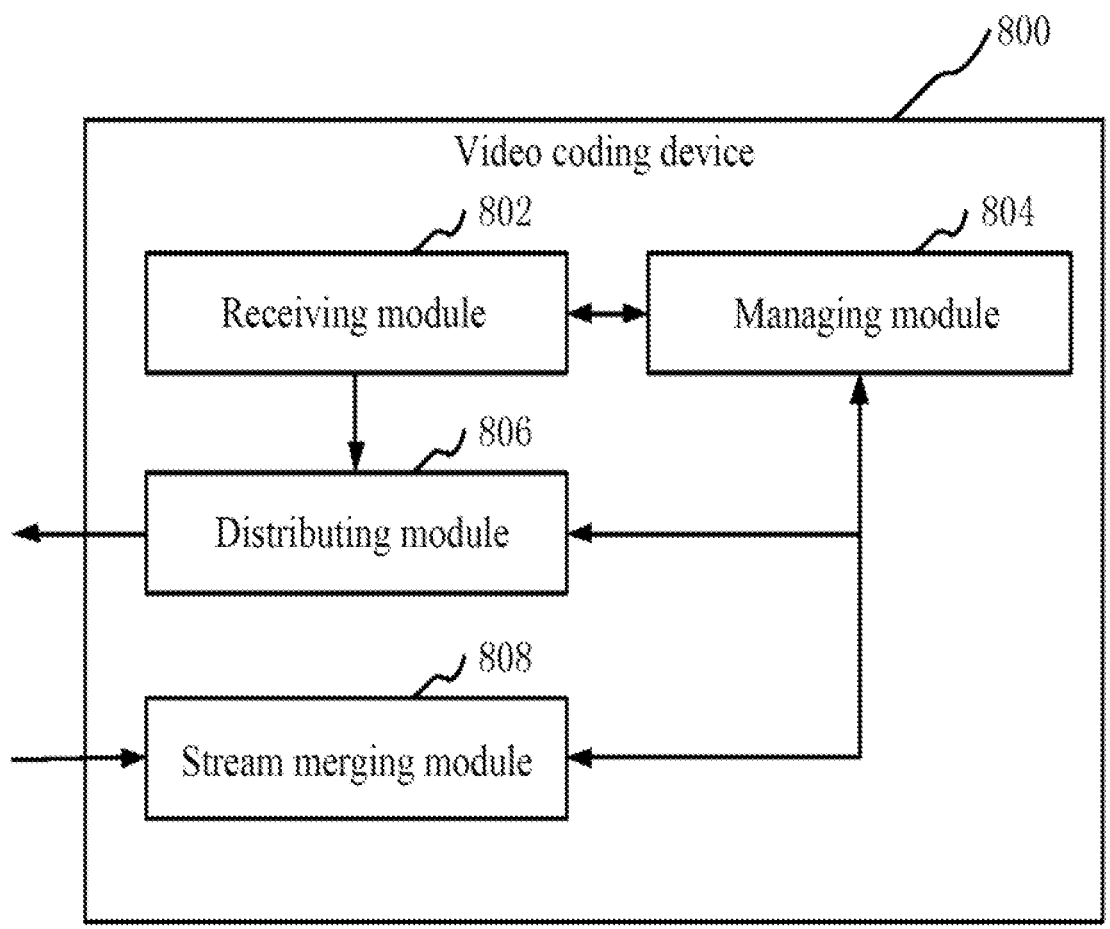
FIG. 8 is a block diagram of a video coding device, according to an exemplary embodiment.

As shown in FIG. 8, in an embodiment, a video coding device 800 is provided, which has functions of implementing the video coding method. The video coding device 800 includes: a receiving module 802, a managing module 804, a distributing module 806, and a stream merging module 808.

The receiving module 802 is configured to receive the original collected video data sent by the coding requesting terminal, or receive the transmission video stream sent by the coding requesting terminal and obtained by performing compression coding on the original collected video data in the first coding scheme.

The coding requesting terminal is a terminal that has a coding requirement and requests to coding the video. The coding requesting terminal can be the client, for example, the video call client or the video interaction client; the coding requesting terminal can also be the service operation terminal, for example, the live match operation terminal or the live television operation terminal.

The coding requesting terminal includes or is connected to the video capture device; the video capture device can be the video camera, the camera, or the graphics card supporting the D3D. The original collected video data is video data that captured by the coding requesting terminal and not subjected to compression coding. The original collected video data can be either the video data captured by the video camera or the camera, or the D3D game video data output by the graphics card supporting the D3D.

The coding requesting terminal can send out the original collected video data directly. The receiving module 802 is configured to receive the original collected video data. Or, the coding requesting terminal can also perform compression coding on the original collected video data in the first coding scheme, so as to obtain the transmission video stream which is suitable for transmission and then send out the transmission video stream. The receiving module 802 is configured to receive the transmission video stream.

Here, the resources required by the first coding scheme are less than the resources required by the following second coding scheme. In an embodiment, the first coding scheme is the H.264-format coding, and the second coding scheme is the H.265-format coding. Here, coding the original collected video data into the H.265 format requires much more resources than coding the original collected video data into the H.264 format.

It depends on actual needs to determine whether to perform compression coding on the original collected video data in the first coding scheme before transmission. If the coding requesting terminal is the client, it is difficult to realize real-time transmission of the original collected video data by means of the current communication network, and thus compression coding may be performed on the original collected video data in the first coding scheme before it is transmitted to the distributing server. If the coding requesting terminal is the service operation terminal, the original collected video data can be sent to the distributing server directly when the network status is good or the requirement for real-time performance is not high.

The managing module 804 is configured to divide each video frame image of the original collected video data into multiple subarea images, or divide each video frame image of the original collected video data obtained by decoding the transmission video stream into multiple subarea images.

The original collected video data includes a number of video frame images. If it is the original collected video data that is received by the receiving module 802, then the receiving module 802 is configured to send the coding request to the managing module 804, the managing module 804 is configured to divide, according to the coding request, each video frame image of the original collected video data into multiple subarea images. Or, if it is the transmission video stream that is received by the receiving module 802, then the receiving module 802 is configured to decode the transmission video stream into the original collected video data, and send the coding request to the managing module 804, the managing module 804 is configured to divide, according to the coding request, each video frame image of the decoded original collected video data into multiple subarea images.

The subarea images are the images in the areas obtained by dividing a video frame image. Preferably, the managing module 804 can be configured to uniformly divide each video frame image of the original collected video data into multiple subarea images, so that the subarea images have a same size. For example, the managing module 804 can be configured to divide each video frame image of the original collected video data into two equal parts, three equal parts, four equal parts, eight equal parts, and so on. For example, referring to FIG. 4, a video frame image 400 of the original collected video data can be divided into four subarea images 401, 402, 403, and 404.

The distributing module 806 is configured to transmit the subarea images obtained by dividing each video frame image to multiple coding servers which code the subarea images in the second coding scheme and output the coded video streams.

The number of the subarea images obtained by dividing each video frame image of the original collected video data can be equal to the number of the coding servers, then each video frame image can be assigned to one of the coding servers; the corresponding coding server performs coding on the subarea images in the second coding scheme s, outputs the coded images in sequence to form the coded video stream, and outputs the coded video stream to the stream merging module 808. Of course, the number of the subarea images obtained by dividing each video frame image of the original collected video data can also not be equal to the number of the coding servers. In this case, according to the load condition of each coding server, the current least loaded coding server may be scheduled for the divided subarea images.

The managing module 804 can generate the coding subtask according to the coding request sent by the distributing module 806 and assign the coding subtask to each coding server; each coding server receives the subarea images from the distributing module 806, codes the received subarea images in the second coding scheme into coded images according to the coding subtask assigned by the managing module 804, and outputs the coded images in sequence to form the coded video stream.

In an embodiment, the subarea image obtained by dividing each video frame image carries the location information for determining the location of the subarea image in the video frame image of the original collected video data. In an embodiment, the subarea image obtained by dividing each video frame image can carry the image identifier, and the managing module 804 can be configured to record the location information corresponding to the image identifier, wherein the location information is used for determining the location of the subarea image in the video frame image of the original collected video data.

The stream merging module 808 is configured to merge the coded video streams output by each coding server into the target video stream.

The stream merging module 808 can be configured to obtain the stream merging policy from the managing server, and merge, according to the stream merging policy, the coded video streams output by the coding servers into the target video stream. Here, stream merging is a process of merging multiple coded video streams into the target video stream. The target video stream is the final video stream obtained by coding the original collected video data in the second coding scheme. The stream merging policy includes a solution about how to merge the coded video streams into the target video stream. The stream merging policy may include the location information corresponding to the coded image obtained by coding the subarea image.

Figure 9:
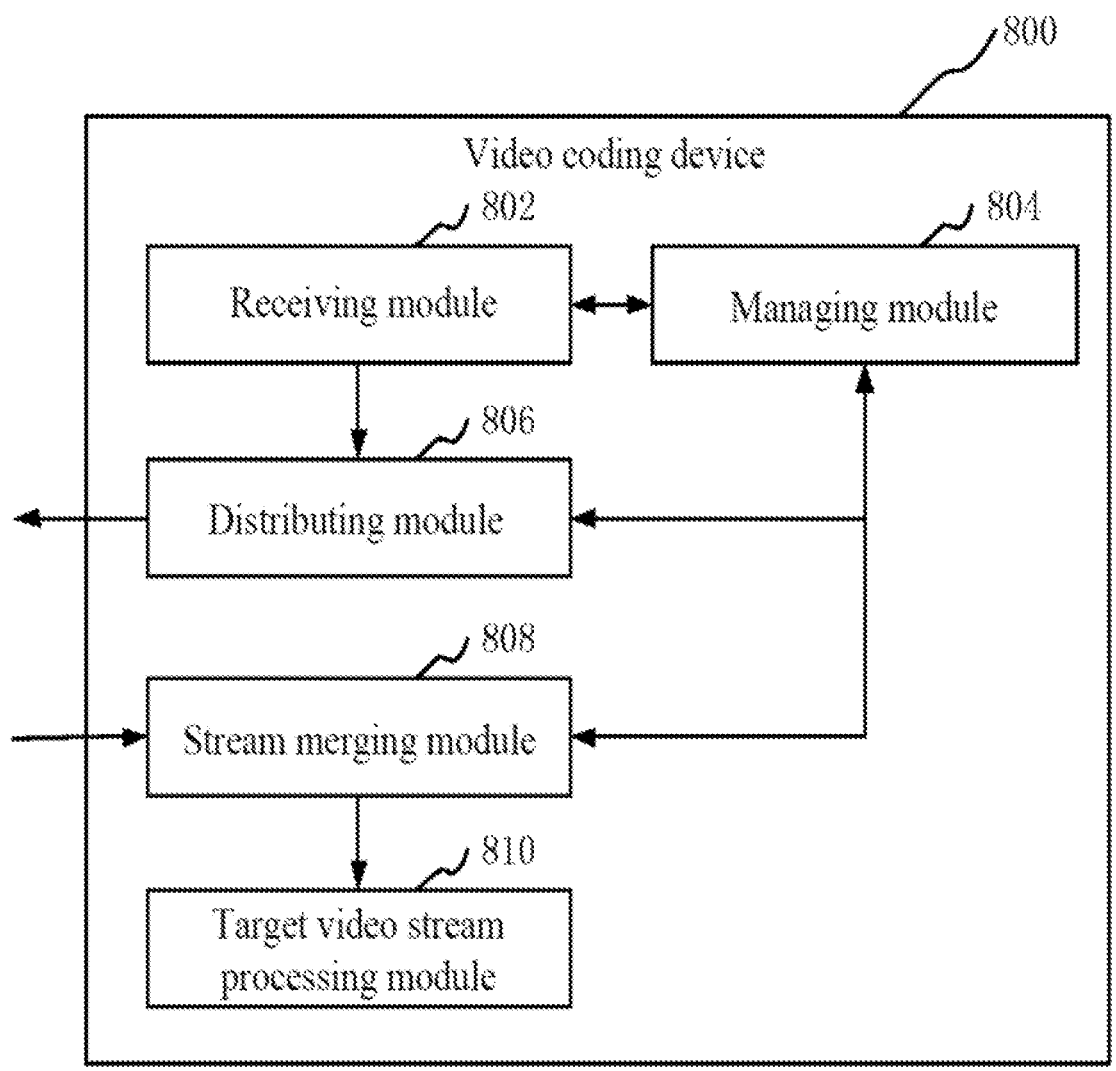
FIG. 9 is a block diagram of a video coding device, according to another exemplary embodiment.

As shown in FIG. 9, in an embodiment, the video coding device 800 further includes a target video stream processing module 810, which is configured to return the target video stream back to the coding requesting terminal, or send the target video stream to the user terminal specified by the coding requesting terminal. Particularly, the coding requesting terminal, when sending the original collected video data or transmitting the video stream to the distributing module 806, may determine according to actual needs whether the stream merging module 802 returns the target video stream back to the coding requesting terminal or the user terminal specified by the coding requesting terminal. The coding requesting terminal can carry the address of the target terminal when sending the original collected video data or transmitting the video stream, so that the stream merging module 808 may send the target video stream to the target terminal after obtaining it. If the address of the target terminal is the address of the coding requesting terminal, then the stream merging module 808 returns the target video stream back to the coding requesting terminal.

The video coding device 800 divides each video frame image of the original collected video data into multiple subarea images and sends the multiple subarea images to multiple coding servers for perform distributed coding, and finally merges the coded video streams output by the coding servers into the target video stream. In this way, it is possible for multiple coding servers to cooperatively perform the coding, instead of performing the coding by a single device, which greatly improves the coding efficiency. Besides, the coding requesting terminal does not have to perform final complex coding in the second coding scheme, in other words, the method has a low requirement on hardware of the coding requesting terminal and enables the new coding technology to be applied to the civil field quickly.

In an embodiment, the managing module 804 is further configured to assign, according to the location of the subarea image in the video frame image to which the subarea image belongs, the coding server address in a unit of subarea image stream data formed by the subarea images obtained by divisions at the same location. The subarea image stream data is formed by the subarea images obtained by dividing at the same location. The distributing module 806 is further configured to transmit each piece of subarea image stream data to the coding server corresponding to the assigned coding server address to perform coding in the second coding scheme and output the coded video stream.

Particularly, in the present embodiment, the subarea images are obtained by dividing each video frame image in the same dividing way. The video frame image to which the subarea image belongs means that the subarea image is divided from the video frame image. The subarea images divided at the same location mean that all of these subarea images are divided at the same location of the corresponding video frame images; for example, if each of the video frame images are divided into four equal parts, the subarea images at the top left corner of the video frame images can form a piece of subarea image stream data. In a unit of the subarea image stream data means assigning each piece of subarea image stream data with a different coding server address.

Referring to FIG. 6, the original collected video data 600 includes a number of video frame images 610, 620, 630, 640 . . . , which are arranged in sequence. Each video frame image is divided into four equal parts, and each video frame image is divided into four subarea images at four locations of the video frame image. The subarea images at the top left corner of the video frame images of the original collected video data 600 are 611, 621, 631, 641 . . . respectively, which form a piece of subarea image stream data, and the managing module 804 assigns a coding server address to the subarea image stream data. Different coding server addresses are assigned to different subarea image stream data; for example, the managing module 804 assigns another coding server address to the subarea image stream data formed by the subarea images 612, 622, 632, 642 . . . .

The distributing module 806 is configured to transmit a piece of subarea image stream data 611, 621, 631, 641 . . . to the coding server which corresponds to the coding server address assigned to said piece of subarea image stream data, and transmits another piece of subarea image stream data 612, 622, 632, 642 . . . to the coding server which corresponds to another coding server address assigned to said another piece of subarea image stream data. By analogy, all pieces of subarea image stream data are separately transmitted to different coding servers.

The managing module 804 can be configured to generate a coding subtask according to the coding request sent by the distributing module 806 and assign the coding subtask to each coding server; each coding server receives the subarea images from the distributing module 806, codes the received subarea images in the second coding scheme according to the coding subtask assigned by the managing module 804 to obtain the coded images, and outputs the coded images in sequence to form the coded video stream.

In an embodiment, a subarea image obtained by dividing a video frame image carries the location information for determining the location of the subarea image in the video frame image of the original collected video data. In an embodiment, a subarea image obtained by dividing a video frame image can carry the image identifier, and the managing module 804 can record the location information corresponding to the image identifier, wherein the location information is used for determining the location of the subarea image in the video frame image of the original collected video data.

In the present embodiment, the subarea images obtained by divisions at the same location are assigned to the same coding server address, and the subarea images by divisions at different locations are assigned to the different coding server addresses, and thus the stream merging module 808 can merge the coded video streams output by each coding server efficiently, and the coding efficiency is further improved.

In an embodiment, the stream merging module 808 can be further configured to, for each of the coded images in the coded video stream output by each of the coding servers, obtain location information of a corresponding subarea image relative to the video frame image to which the subarea image belongs, and merge, according to the location information, the coded video streams output by the coding servers into the target video stream.

Particularly, the coded images in the coded video streams output by the coding server correspond to the subarea images in the subarea image stream data input in the coding server, and the location information of the coded images is the location information of the corresponding subarea images.

The stream merging module 808 can be configured to obtain the location information carried by the subarea images obtained by dividing the video frame images, or obtain the location information corresponding to the image identifiers which are carried by the subarea images obtained by dividing the video frame images.

The stream merging module 808 is configured to merge, according to how each video frame image of the original collected video data is divided into multiple subarea images, the coded video streams output by each coding server into the target video stream. Referring to FIG. 6, after the subarea images 611, 612, 613, and 614 are coded into the coded images, the stream merging module 808 merges the coded images according to the location relationship of the subarea images in FIG. 6; by this analogy, other coded images are also merged into the target video stream according to the location relationship of the corresponding subarea images in the corresponding video frame images.

In the present embodiment, the coded video streams output by the coding servers are merged into the target video stream according to the location information of the subarea images relative to the video frame images to which the subarea images belong, the subarea images correspond to the coded images in the coded video streams output by the coding servers, and thus the coded video streams output by the coding servers can be merged efficiently, and the coding efficiency is further improved.

Referring to FIG. 1, in an embodiment, a video coding system 100 is provided, which includes a distributing server 102, a managing server 104, a coding server 106, and a stream merging server 108. The distributing server 102 is connected with the coding server 106, the coding server 106 is connected with the stream merging server 108, and the managing server 104 is connected with the distributing server 102, the coding server 106 and the stream merging server 108, respectively.

The distributing server 102 is configured to receive the original collected video data sent by the coding requesting terminal 110, or receive the transmission video stream sent by the coding requesting terminal 110 and obtained by performing compression coding on the original collected video data in the first coding scheme.

The coding requesting terminal 110 is a terminal that has a coding requirement and requests to code the video. The coding requesting terminal 110 can be the client, for example, the video call client or the video interaction client; the coding requesting terminal 110 can also be the service operation terminal, for example, the live match operation terminal or the live television operation terminal.

The coding requesting terminal 110 includes or is connected to the video capture device; the video capture device can be the video camera, the camera, or the graphics card supporting the D3D. The original collected video data is that captured by the coding requesting terminal 110 and not subjected to compression coding. The original collected video data can be either the video data captured by the video camera or the camera, or the D3D game video data output by the graphics card supporting the D3D.

The coding requesting terminal 110 may be configured to send the original collected video data to the distributing server 102 directly; the original collected video data is received by the distributing server 102. Or, the coding requesting terminal 110 can also perform compression coding on the original collected video data in the first coding scheme, so as to obtain the transmission video stream which is suitable for transmission and then transmit the transmission video stream to the distributing server 102; the transmission video stream is received by the distributing server 102.

Here, the resources required by the first coding scheme are less than the resources required by the following second coding scheme. In an embodiment, the first coding scheme is the H.264-format coding scheme, and the second coding scheme is the H.265-format coding scheme. Here, coding the original collected video data into the H.265 format requires much more resources than coding the original collected video data into the H.264 format.

It depends on actual needs to determine whether to perform compression coding on the original collected video data in the first coding scheme before transmission. If the coding requesting terminal 110 is the client, it is difficult to realize real-time transmission of the original collected video data by means of the current communication network, and thus the coding requesting terminal 110 performs compression coding on the original collected video data in the first coding scheme before it is transmitted to the distributing server 102. If the coding requesting terminal 110 is the service operation terminal, the coding requesting terminal 110 can send the original collected video data to the distributing server 102 directly when the network status is good or the requirement for real-time performance is not high.

The managing server 104 is configured to divide each video frame image of the original collected video data into multiple subarea images, or divide each video frame image of the original collected video data obtained by decoding the transmission video stream into multiple subarea images.

The original collected video data includes a number of video frame images. If it is the original collected video data that is received by the distributing server 102, then the distributing server 102 sends a coding request to the managing server 104, and the managing server 104 divides, according to the coding request, each video frame image of the original collected video data into multiple subarea images. Or, if it is the transmission video stream that is received by the distributing server 102, then the distributing server 102 decodes the transmission video stream into the original collected video data, and sends the coding request to the managing server 104; the managing server 104 divides, according to the coding request, each video frame image of the decoded original collected video data into multiple subarea images.

The subarea images are the images in areas obtained by dividing a video frame image into multiple areas. Preferably, the managing server can uniformly divide each video frame image of the original collected video data into multiple subarea images, so that the subarea images have a same size. For example, the managing server can divide each video frame image of the original collected video data into two equal parts, three equal parts, four equal parts, eight equal parts, and so on. For example, referring to FIG. 4, one video frame image 400 in the original collected video data can be equally divided into four subarea images 401, 402, 403, and 404.

The distributing server 102 is further configured to transmit the subarea images obtained by dividing each video frame image to multiple coding servers 106. The number of the subarea images obtained by dividing each video frame image of the original collected video data can be equal to the number of the coding servers 106, then each video frame image can be assigned to one of the coding servers 106. Of course, the number of the subarea images obtained by dividing each video frame image of the original collected video data can also not be equal to the number of the coding servers 106. In this case, according to the load condition of each coding server 106, the distributing server 102 may schedule the current least loaded coding server 106 for the divided subarea images.

The coding server 106 is configured to receive the subarea images from the distributing server 102, and code the subarea images in the second coding scheme and output the coded video stream.

The coding server 106 is configured to code the subarea images received from the distributing server 102 in the second coding scheme, and output the coded images in sequence to form the coded video stream. The coding server 106 is configured to output the coded video stream to the stream merging server 108.

The managing server 104 may be configured to generate the coding subtask according to the coding request sent by the distributing server 102, and assign the coding subtask to each coding server 106; each coding server 106 is configured to receive the subarea images from the distributing server 102, obtain the coded images by performing coding on the received subarea images in the second coding scheme according to the coding subtask assigned by the managing server 104, and output the coded images in sequence to form the coded video stream.

In an embodiment, the subarea image obtained by dividing each video frame image carries the location information for determining the location of the subarea image in the video frame image of the original collected video data. In an embodiment, the subarea image obtained by dividing each video frame image can carry the image identifier, and the managing server 104 may be configured to record the location information corresponding to the image identifier. Here, the location information is used for determining the location of the subarea image in the video frame image of the original collected video data.

The stream merging server 108 is configured to merge the coded video streams output by the coding servers into the target video stream.

The stream merging server 108 can be configured to obtain the stream merging policy from the managing server 104, and merge, according to the stream merging policy, the coded video streams output by the coding servers 106 into the target video stream. Here, stream merging is a process of merging multiple coded video streams into the target video stream. The target video stream is the final video stream obtained by performing coding on the original collected video data in the second coding scheme. The stream merging policy includes a solution about how to merge the coded video streams into the target video stream. The stream merging policy may include the location information corresponding to the coded image obtained by coding the subarea image.

In an embodiment, the stream merging server 108 is further configured to return the target video stream back to the coding requesting terminal 110, or send the target video stream to the user terminal 120 specified by the coding requesting terminal 110. Particularly, the coding requesting terminal 110, when sending the original collected video data or transmitting the video stream to the distributing server 106, may determine according to actual needs whether the stream merging server 108 returns the target video stream back to the coding requesting terminal 110 or the user terminal 120 specified by the coding requesting terminal 110. The coding requesting terminal 110 can carry an address of the target terminal when sending the original collected video data or transmitting the video stream, so that the stream merging server 108 sends the target video stream to the target terminal after obtaining the target video stream. If the address of the target terminal is the address of the coding requesting terminal 110, then the stream merging server 108 is configured to return the target video stream back to the coding requesting terminal 110.

According to the above video coding system, each video frame image of the original collected video data is divided into multiple subarea images and the multiple subarea images are sent to multiple coding servers 106 to perform distributed coding, and finally the coded video streams output by each coding server 106 are merged into the target video stream. In this way, it is possible for multiple coding servers 106 to cooperatively perform the coding, instead of performing the coding by a single device, which greatly improves the coding efficiency. Besides, the coding requesting terminal 110 does not have to perform final complex coding in the second coding scheme, in other words, the system has a low requirement on hardware of the coding requesting terminal 110 and enables the new coding technology to be applied to the civil field quickly.

In an embodiment, the managing server 104 is further configured to assign, according to the location of the subarea image in the video frame image to which the subarea image belongs, the coding server address in a unit of the subarea image stream data formed by the subarea images obtained by divisions at the same location. The distributing server 102 is further configured to transmit each piece of subarea image stream data to the coding server 106 corresponding to the assigned coding server address.

Particularly, in the present embodiment, the subarea images are obtained by dividing each video frame image in the same dividing way. The video frame image to which the subarea image belongs means that the subarea image is divided from the video frame image. The subarea images obtained by divisions at the same location mean that all of these subarea images are obtained from the same location of the corresponding video frame images; for example, if each of the video frame images are divided into four equal parts, the subarea images at the top left corner of the video frame images can form a piece of subarea image stream data. In a unit of the subarea image stream data means assigning each piece of subarea image stream data with a different coding server address.

Referring to FIG. 6, the original collected video data 600 includes a number of video frame images 610, 620, 630, 640 . . . , which are arranged in sequence. Each video frame image is divided into four equal parts, and four subarea images are obtained by division at four locations of the video frame image. Therefore, the subarea images at the top left corner of each video frame image of the original collected video data 600 are 611, 621, 631, 641 . . . respectively, which form a piece of subarea image stream data, and the managing server 104 assigns a coding server address to the subarea image stream data. Different coding server addresses are assigned to different subarea image stream data; for example, the managing server 104 assigns another coding server address to the subarea image stream data formed by the subarea images 612, 622, 632, 642 . . . .

Particularly, referring to FIG. 6, the distributing server 102 transmits a piece of subarea image stream data 611, 621, 631, 641 . . . to the coding server 106 which corresponds to the coding server address assigned to said piece of subarea image stream data, and transmits another piece of subarea image stream data 612, 622, 632, 642 . . . to the coding server 106 which corresponds to another coding server address assigned to said another piece of subarea image stream data. By analogy, all pieces of subarea image stream data are separately transmitted to different coding servers 106.

The managing server 104 can be configured to generate the coding subtask according to the coding request sent by the distributing server 102 and assign the coding subtask to each coding server 106; each coding server 106 receives the subarea images from the distributing server 102, codes the received subarea images in the second coding scheme into the coded images according to the coding subtask assigned by the managing server 104, and outputs the coded images in sequence to form the coded video stream.

In an embodiment, a subarea image obtained by dividing a video frame image carries the location information for determining the location of the subarea image in the video frame image of the original collected video data. In an embodiment, a subarea image obtained by dividing a video frame image can carry the image identifier, and the managing server 104 can record the location information corresponding to the image identifier, wherein the location information is used for determining the location of the subarea image in the video frame image of the original collected video data.

In the present embodiment, the subarea images obtained by divisions at the same location are assigned to the same coding server address, and the subarea images by divisions at different locations are assigned to the different coding server addresses, and thus the stream merging server 108 can merge the coded video streams output by each coding server efficiently, and the coding efficiency is further improved.

In an embodiment, the stream merging server 108 is further configured to for each of the coded images in the coded video stream output by each of the coding servers 106, obtaining location information of a corresponding subarea image relative to the video frame image from which the subarea image is divided, and merge, according to the location information, the coded video streams output by each coding server 106 into the target video stream.

Particularly, the coded image in the coded video streams output by each coding server 106 correspond to the subarea images in the subarea image stream data input in the coding server 106, and the location information of the coded image is the location information of the corresponding subarea image.

The stream merging server 108 can be configured to obtain the location information carried by the subarea image obtained by dividing each video frame image, or obtain the location information corresponding to the image identifier which is carried by the subarea image obtained by dividing each video frame image.

Particularly, the stream merging server 108 merges, according to how each video frame image of the original collected video data is divided into multiple subarea images, the coded video streams output by the coding servers 106 into the target video stream.

In the present embodiment, the coded video streams output by the coding servers 106 are merged into the target video stream according to the location information of the subarea images relative to the video frame images to which the subarea images belong, the subarea images correspond to the coded images in the coded video streams output by the coding servers, and thus the coded video streams output by the coding servers can be merged efficiently, and the coding efficiency is further improved.

Persons of ordinary skill in the art can understand that all or part of the flows in the embodiments of the method can be completed by instructing related hardware through a computer program. The program can be stored in a non-volatile computer-readable storage medium; when the program is executed, the flows of the embodiments of the method can be included. Wherein, the storage medium can be a magnetic disk, a compact disk, a Read-Only Memory (ROM), Random Access Memory (RAM) and so on.

The above embodiments only express several implementation modes of the disclosure, and the description is comparatively specific and detailed; however, the above embodiments cannot be understood as a limit to the scope of the disclosure. It should be indicated that, on the premise of not departing from the conception of the disclosure, persons of ordinary skill in the art may also make a number of modifications and improvements which fall within the scope of the disclosure. Therefore, the scope of the disclosure is only limited by the appended claim.

The invention claimed is:

1. A video coding method performed at a video coding system including a distributing server, a managing server, multiple coding servers, and a stream merging server, wherein the distributing server is connected to the coding servers, the coding servers are connected to the stream merging server, and the managing server is connected to the distributing server, the coding servers and the stream merging server, respectively, each server configured to perform a respective task of the video coding method, the method comprising:

receiving, by the distributing server, original collected video data from a coding requesting terminal;

dividing, by the managing server, each video frame image of the original collected video data into multiple subarea images;

transmitting, by the distributing server, the subarea images divided from each video frame image of the original collected video data to the multiple coding servers of which a coder is performed from a multi-threaded framework into a multi-process framework, to code the subarea images in a second coding scheme and output a coded video stream;

coding, by each of the multiple coding servers, a respective subset of the subarea images in the second coding scheme and outputting, to the stream merging server, a coded video stream corresponding to the respective subset of the subarea images;

merging, by the stream merging server, the coded video streams output by the multiple coding servers into a target video stream in the second coding scheme; and sending, by the stream merging server, the target video stream to a user terminal specified by the coding requesting terminal, wherein the user terminal decodes the target video stream from the second coding scheme into a second sequence of video frame images to be played at the user terminal.

2. The method of claim 1, further comprising:

uniformly dividing, by the managing server, each video frame image of the original collected video data into multiple subarea images, so that the divided subarea images have a same size.

3. The method of claim 1, wherein transmitting, by the distributing server, the subarea images divided from each video frame image of the original collected video data to the multiple coding servers of which a coder is performed from a multithreaded framework into a multi-process framework, to code the subarea images in a second coding scheme and output a coded video stream comprises:

according to a location of each of the subarea images in the video frame image, from which the subarea image is divided, assigning, by the managing server, a respective coding server address in a unit of subarea image stream data formed by the divided subarea images at a same location; and transmitting, by the distributing server, each piece of subarea image stream data to a respective one of the coding servers, corresponding to the assigned coding server address, to code the piece of subarea image stream data in the second coding scheme and output the coded video stream.

4. The method of claim 1, wherein transmitting, by the distributing server, the subarea images divided from each video frame image to multiple coding servers of which a coder is performed from a multithreaded framework into a multi-process framework, to code the subarea images in a second coding scheme and output a coded video stream comprises:

when a number of the subarea images divided from each video frame image of the original collected video data is equal to a number of the coding servers, distributing, by the distributing server, the subarea images divided from each video frame image to a corresponding one of the multiple coding servers, coding, by the corresponding coding server, the subarea images in the second coding scheme, and outputting the coded subarea images in sequence to form the coded video stream; and when the number of the subarea images divided from each video frame image of the original collected video data is not equal to the number of the coding servers, scheduling, by the managing server, a current least loaded coding server for the subarea images divided from each video frame image, to code the subarea images in the second coding scheme and output the coded video stream.

5. The method of claim 1, wherein merging, by the stream merging server, the coded video streams output by the coding servers into a target video stream in the second coding scheme comprises:
for each of the coded images in the coded video stream output by each of the multiple coding servers,
obtaining, by the stream merging server, location information of a corresponding subarea image relative to the video frame image from which the subarea image is divided; and
merging, by the stream merging server, the coded video streams output by the coding servers into the target video stream according to the location information.

6. The method of claim 1, further comprising:
returning, by the stream merging server, the target video stream back to the coding requesting terminal.

7. The method of claim 1, wherein the second coding scheme is an H.265-format coding scheme.

8. A video coding system including a distributing server, a managing server, multiple coding servers, and a stream merging server, wherein the distributing server is connected to the coding servers, the coding servers are connected to the stream merging server, and the managing server is connected to the distributing server, the coding servers and the stream merging server, respectively, each server comprising a nonvolatile storage medium and a processor; the nonvolatile storage medium having instructions stored therein, the instructions, when executed by the processor, causing the processor to perform a respective task of a video coding method including the following steps:
receiving, by the distributing server, original collected video data from a coding requesting terminal;
dividing, by the managing server, each video frame image of the original collected video data into multiple subarea images;
transmitting, by the distributing server, the subarea images divided from each video frame image of the original collected video data to the multiple coding servers of which a coder is performed from a multithreaded framework into a multi-process framework, to code the subarea images in a second coding scheme and output a coded video stream;
coding, by each of the multiple coding servers, a respective subset of the subarea images in the second coding scheme and outputting, to the stream merging server, a coded video stream corresponding to the respective subset of the subarea images;
merging, by the stream merging server, the coded video streams output by the multiple coding servers into a target video stream in the second coding scheme; and
sending, by the stream merging server, the target video stream to a user terminal specified by the coding requesting terminal, wherein the user terminal decodes the target video stream from the second coding scheme into a second sequence of video frame images to be played at the user terminal.

9. The video coding system of claim 8, wherein the instructions, when executed by the processor, further causes the processor to perform the following steps:
uniformly dividing, by the managing server, each video frame image of the original collected video data into multiple subarea images, so that the divided subarea images have a same size.

10. The video coding system of claim 8, wherein the step of transmitting, by the distributing server, the subarea images divided from each video frame image of the original collected video data to the multiple coding servers of which a coder is performed from a multithreaded framework into a multi-process framework, to code the subarea images in a second coding scheme and output a coded video stream comprises:
according to a location of each of the subarea images in the video frame image, from which the subarea image is divided, assigning, by the managing server, a respective coding server address in a unit of subarea image stream data formed by the divided subarea images at a same location; and
transmitting, by the distributing server, each piece of subarea image stream data to a respective one of the coding servers, corresponding to the assigned coding server address, to code the piece of subarea image stream data in the second coding scheme and output the coded video stream.

11. The video coding system of claim 8, wherein the step of transmitting, by the distributing server, the subarea images divided from each video frame image to multiple coding servers of which a coder is performed from a multithreaded framework into a multi-process framework, to code the subarea images in a second coding scheme and output a coded video stream comprises:
when a number of the subarea images divided from each video frame image of the original collected video data is equal to a number of the coding servers, distributing the subarea images divided from each video frame image to one of the coding servers, coding, by the corresponding coding server, the subarea images in the second coding scheme, and outputting the coded subarea images in sequence to form the coded video stream; and
when the number of the subarea images divided from each video frame image of the original collected video data is not equal to the number of the coding servers, scheduling a current least loaded coding server for the subarea images divided from each video frame image, to code the subarea images in the second coding scheme and output the coded video stream.

12. The video coding system of claim 8, wherein the step of merging the coded video streams output by the coding servers into a target video stream in the second coding scheme, performed by the processor, comprises:
for each of the coded images in the coded video stream output by each of the multiple coding servers,
obtaining, by the stream merging server, location information of a corresponding subarea image relative to the video frame image from which the subarea image is divided; and
merging, by the stream merging server, the coded video streams output by the coding servers into the target video stream according to the location information.

13. The video coding system of claim 8, wherein the instructions, when executed by the processor, further causes the processor to perform the following steps:
returning, by the stream merging server, the target video stream back to the coding requesting terminal.

14. The video coding system of claim 8, wherein the second coding scheme is an H.265-format coding scheme.

15. A video coding system, comprising a distributing server, a managing server, multiple coding servers, and a stream merging server; the distributing server is connected to the multiple coding servers, the coding servers are connected to the stream merging server, and the managing server is connected to the distributing server, the coding servers and the stream merging server, respectively;

the distributing server is configured to receive original collected video data from a coding requesting terminal;

the managing server is configured to divide each video frame image of the original collected video data into multiple subarea images;

the distributing server is further configured to transmit the subarea images divided from each video frame image to the multiple coding servers of which a coder is performed from a multithreaded framework into a multi-process framework;

each of the multiple coding servers is configured to receive a respective subset of the subarea images from the distributing server, and code the respective subset of the subarea images in a second coding scheme and output, to the stream merging server, a coded video stream corresponding to the respective subset of the subarea images;

the stream merging server is configured to merge the coded video streams output by the coding servers into a target video stream in the second coding scheme; and the stream merging server is configured to send the target video stream to a user terminal specified by the coding requesting terminal, wherein the user terminal decodes the target video stream from the second coding scheme into a second sequence of video frame images to be played at the user terminal.

16. The video coding system of claim 15, wherein the managing server is further configured to uniformly divide each video frame image of the original collected video data into multiple subarea images, so that the divided subarea images have a same size.

17. The video coding system of claim 15, wherein the managing server is further configured to, according to a location of each of the subarea images in the video frame image, from which the subarea image is divided, assign a respective coding server address in a unit of subarea image stream data formed by the divided subarea images at a same location;

the distributing server is further configured to transmitting each piece of subarea image stream data to a respective one of the coding servers, corresponding to the assigned coding server address.

18. The video coding system of claim 15, wherein the managing server is further configured to, when a number of the subarea images divided from each video frame image of the original collected video data is equal to a number of the coding servers, distribute the subarea images divided from each video frame image to one of the coding servers, wherein the corresponding coding server codes the subarea images in the second coding scheme, and outputs the coded subarea images in sequence to form the coded video stream; and the managing server is further configured to, when the number of the subarea images divided from each video frame image of the original collected video data is not equal to the number of the coding servers, schedule a current least loaded coding server for the subarea images divided from each video frame image, to code the subarea images in the second coding scheme and output the coded video stream.

19. The video coding system of claim 15, wherein the stream merging server is further configured to for each of the coded images in the coded video stream output by each of the coding servers, obtain location information of a corresponding the subarea image relative to the video frame image from which the subarea image is divided; and merge the coded video streams output by the coding servers into the target video stream according to the location information.

20. The video coding system of claim 15, wherein the stream merging server is further configured to return the target video stream back to the coding requesting terminal.

* * * * *